United States Patent
Morita et al.

(10) Patent No.: US 11,048,503 B2
(45) Date of Patent: Jun. 29, 2021

(54) CODE READING SUPPORTING DEVICE, CODE READING SUPPORTING METHOD, AND STORAGE MEDIUM

(71) Applicant: KABUSHIKI KAISHA TOSHIBA, Minato-ku (JP)

(72) Inventors: Shou Morita, Kawasaki (JP); Mamoru Aoki, Kawasaki (JP); Takenori Koshiro, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/295,810

(22) Filed: Mar. 7, 2019

(65) Prior Publication Data
US 2019/0294434 A1    Sep. 26, 2019

(30) Foreign Application Priority Data

Mar. 23, 2018   (JP) ............................. JP2018-055707

(51) Int. Cl.
| | |
|---|---|
| G06F 9/44 | (2018.01) |
| G06F 8/75 | (2018.01) |
| G06F 8/72 | (2018.01) |
| G06F 8/38 | (2018.01) |
| G06F 8/41 | (2018.01) |

(52) U.S. Cl.
CPC .................. *G06F 8/75* (2013.01); *G06F 8/38* (2013.01); *G06F 8/427* (2013.01); *G06F 8/72* (2013.01)

(58) Field of Classification Search
CPC ... G06F 8/38; G06F 8/427; G06F 8/72; G06F 8/75
USPC .................................................. 717/110–123
See application file for complete search history.

(56) References Cited

U.S. PATENT DOCUMENTS

| | | | | |
|---|---|---|---|---|
| 8,181,167 | B2 * | 5/2012 | Zhao ...................... | G06F 8/427 |
| | | | | 717/143 |
| 9,158,503 | B2 * | 10/2015 | Misbhauddin ............ | G06F 8/72 |
| 10,209,963 | B2 * | 2/2019 | Hutchison ............... | G06F 8/451 |
| 2012/0192151 | A1 * | 7/2012 | Parkes ...................... | G06F 8/34 |
| | | | | 717/120 |

OTHER PUBLICATIONS

Spinellis, "The CScout Refactoring Browser", 2016, Athens University, Greece, 67 pages. (Year: 2016).*

(Continued)

*Primary Examiner* — Ted T. Vo
(74) *Attorney, Agent, or Firm* — Obion, McClelland, Maier & Neustadt, L.L.P.

(57) ABSTRACT

According to one embodiment, a code information storage is configured to store information on a plurality of functions, a calling relationship between the plurality of functions, and code blocks in the respective plurality of functions. A user operation storage is configured to store information of an already read code block. An already read graph generator is configured to generate an already read graph expressing an already read function including the already read code block, all the code blocks included in the already read function, and a calling relationship between the already read code block and the already read function. An expression of the already read code block differs from an expression of the other code block.

7 Claims, 7 Drawing Sheets

(56) References Cited

OTHER PUBLICATIONS

Schulte et al., "An Introduction to Program Comprehension for Computer Science Educators", 2014, ResearchGate, pp. 65-86. (Year: 2014).*

Yuu Ohmura et al., "Design and Implementation of a Source Code Reading Helper Tool for Program Comprehension", Conference Proceedings Japan Society for Software Science and Technology (31st), Sep. 7, 2014, 10 pages, (with Machine Generated English Translation).

* cited by examiner

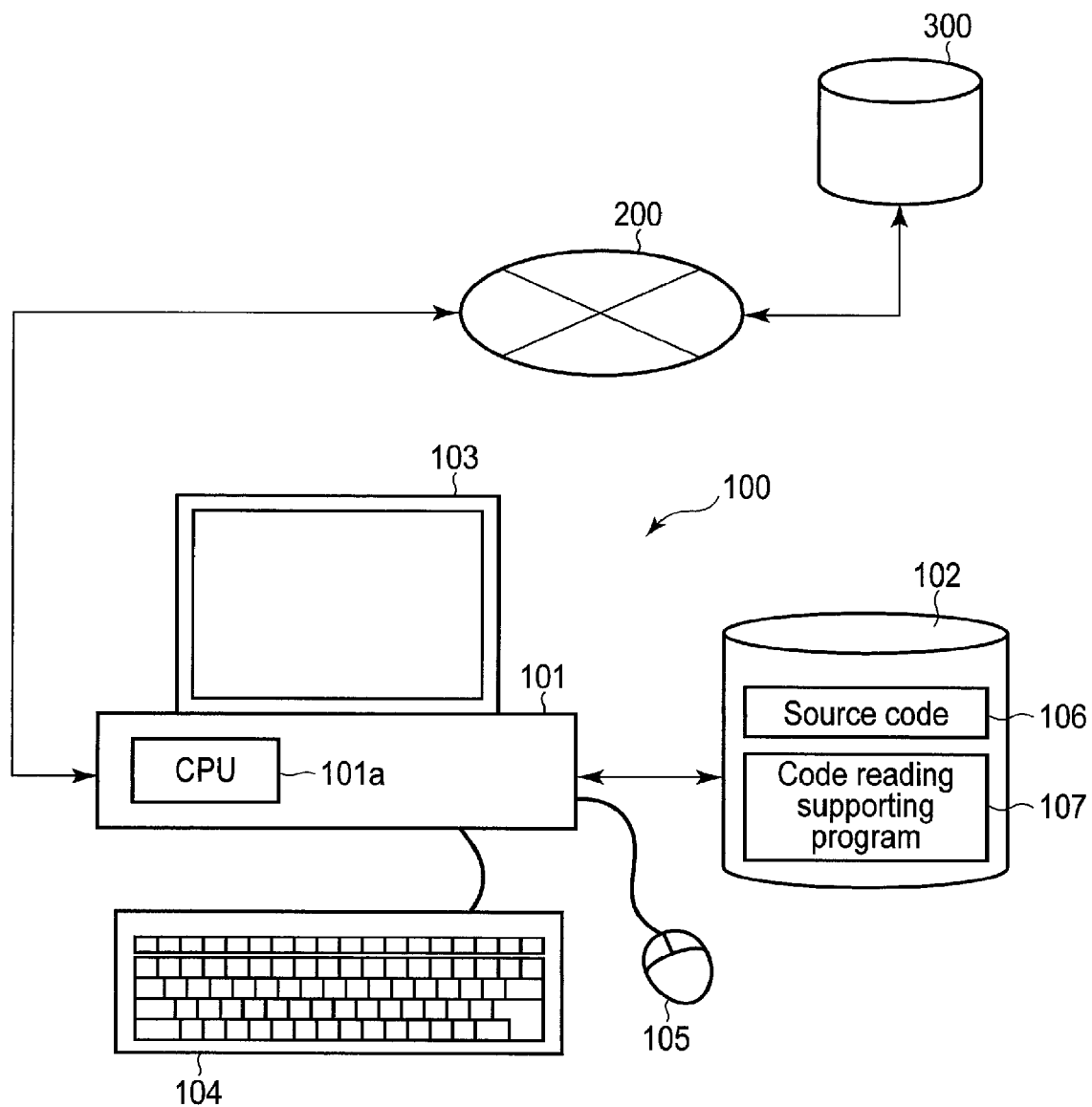
F I G. 1

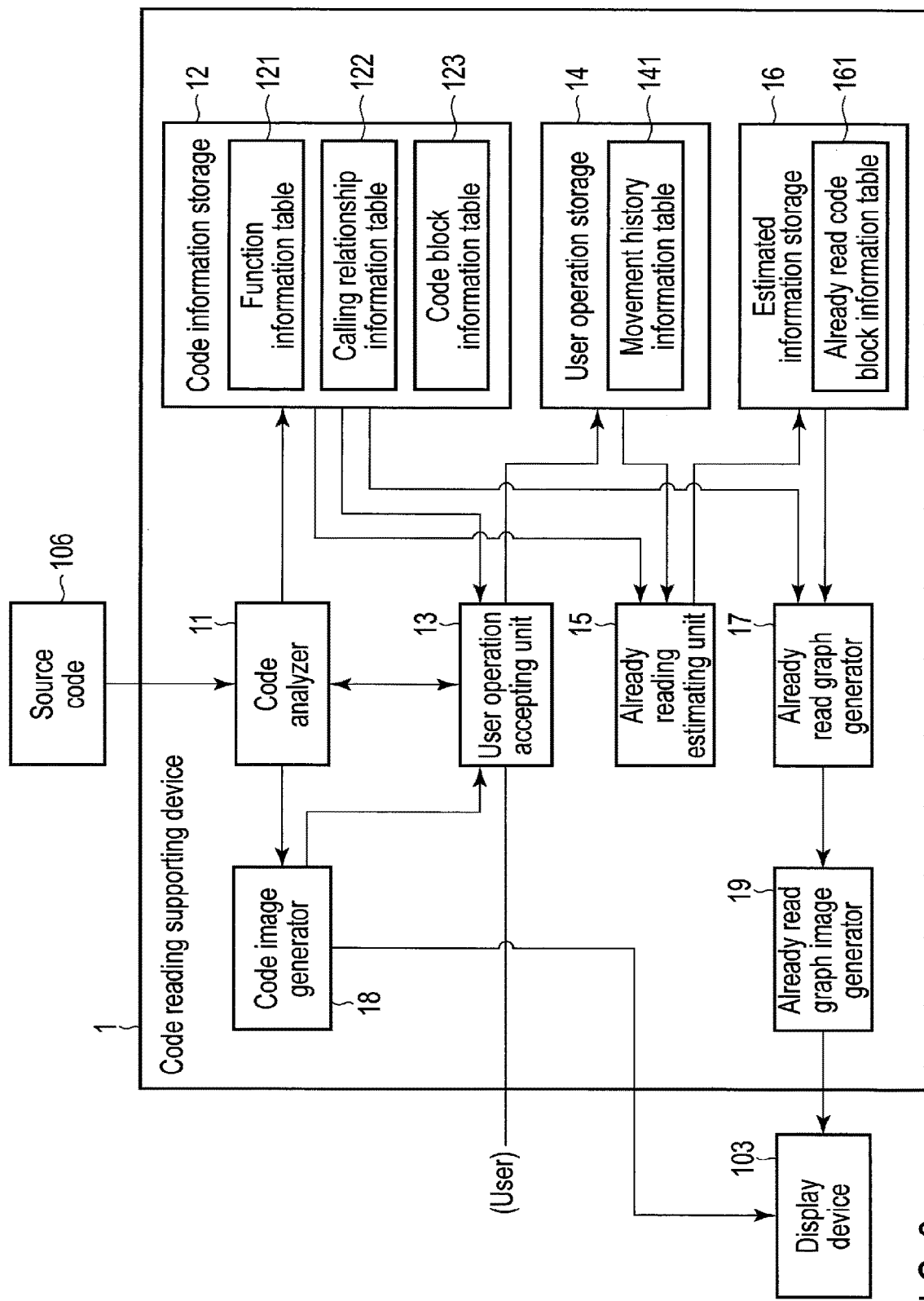
F I G. 2

FIG. 4 (121)

| Function names | Start line numbers | End line numbers |
|---|---|---|
| a | 1 | 3 |
| b | 5 | 11 |
| c | 13 | 15 |
| d | 17 | 19 |
| e | 21 | 23 |
| f | 25 | 27 |

FIG. 5 (122)

| Calling function names | Called function names | Call line numbers |
|---|---|---|
| a | b | 2 |
| b | c | 7 |
| b | f | 9 |
| c | d | 14 |
| d | e | 18 |
| f | e | 26 |

FIG. 3 (106)

| Line numbers | Source code |
|---|---|
| 1 | void a() { |
| 2 | b(); |
| 3 | } |
| 4 | |
| 5 | void b() { |
| 6 | if(...) { |
| 7 | c(); |
| 8 | } else { |
| 9 | f(); |
| 10 | } |
| 11 | } |
| 12 | |
| 13 | void c() { |
| 14 | d(); |
| 15 | } |
| 16 | |
| 17 | void d() { |
| 18 | e(); |
| 19 | } |
| 20 | |
| 21 | void e() { |
| 22 | ; |
| 23 | } |
| 24 | |
| 25 | void f() { |
| 26 | e(); |
| 27 | } |

| Line numbers | Source code |     |
|---|---|---|
| 1 | void a() { | ID1 |
| 2 | b(); | |
| 3 | } | |
| 4 | | |
| 5 | void b() { | ID2 |
| 6 | if(...) { | ID3 |
| 7 | c(); | |
| 8 | } else { | ID4 |
| 9 | f(); | |
| 10 | } | |
| 11 | } | |
| 12 | | |
| 13 | void c() { | ID5 |
| 14 | d(); | |
| 15 | } | |
| 16 | | |
| 17 | void d() { | ID6 |
| 18 | e(); | |
| 19 | } | |
| 20 | | |
| 21 | void e() { | ID7 |
| 22 | ... | |
| 23 | } | |
| 24 | | |
| 25 | void f() { | ID8 |
| 26 | e(); | |
| 27 | } | |

| Code block IDs | Start line numbers | End line numbers | Parent code block IDs |
|---|---|---|---|
| 1 | 1 | 3 | - |
| 2 | 5 | 11 | - |
| 3 | 6 | 7 | 2 |
| 4 | 8 | 9 | 2 |
| 5 | 13 | 15 | - |
| 6 | 17 | 19 | - |
| 7 | 21 | 23 | - |
| 8 | 25 | 27 | - |

FIG. 6B

| Move source line numbers | Move destination line numbers |
|---|---|
| 2 | 5 |
| 7 | 13 |
| 14 | 17 |

| Function names | IDs |
|---|---|
| a | 1 |
| b | 2 |
| b | 3 |
| c | 5 |
| d | 6 |

← 141

CODE READING SUPPORTING DEVICE, CODE READING SUPPORTING METHOD, AND STORAGE MEDIUM

CROSS-REFERENCE TO RELATED APPLICATIONS

This application is based upon and claims the benefit of priority from Japanese Patent Application No. 2018-055707, filed Mar. 23, 2018, the entire contents of which are incorporated herein by reference.

FIELD

Embodiments described herein relate generally to a code reading supporting device, a code reading supporting method, and a storage medium.

BACKGROUND

To develop, improve, and maintain software, comprehension of software is important. However, as software becomes larger in scale, its structure becomes more complicated and can hardly be understood. Conventionally, when debugging a program is performed, source code displayed on a display or a printed sheet is generally checked by viewing.

In a case where a large-scale program is generated with a large quantity of source codes, however, work of deciphering the source codes (hereinafter referred to code reading) is difficult and requires high skill. A device of statically analyzing a source code and automatically creating and illustrating a calling relationship of functions in a program to support the code reading is known. In addition, a device of mapping information obtained by performing debugging on a UML class diagram or a sequence diagram generated from the source code and displaying an execution path is also known.

In general, if code reading is performed while following the execution path, part in a function may be read. In the above-explained device, however, when the source code is deciphered while confirming the calling relationship of functions in the diagram, a problem arises that since a minimum unit of the element illustrated is a function in the diagram of the generated calling relationship of functions, it cannot be confirmed which part of the function is already read and which part is unread. When the execution path is displayed on the UML class diagram or sequence diagram, too, a problem arises that it cannot be discriminated which part of the class diagram is already read and which part is unread.

In addition, when the source code is large in scale, a plurality of workers share code reading, but a problem arises that if the ready read part cannot be understood, confirming progress or sharing the contents understood by each member can hardly be performed by the members and the efficiency in code reading work becomes worse.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a schematic diagram showing an example of a configuration of an information processing device according to an embodiment.

FIG. 2 is a schematic block diagram showing an example of a configuration of a code reading supporting device according to the embodiment.

FIG. 3 is a diagram showing an example of a source code which is a target of code reading.

FIG. 4 is a table showing an example of a function information table.

FIG. 5 is a table showing an example of a calling relationship information table.

FIG. 6A is an example of a source code indicating the range of a code block.

FIG. 6B is a table showing an example of a code block information table.

DETAILED DESCRIPTION

Figures 7, 8:
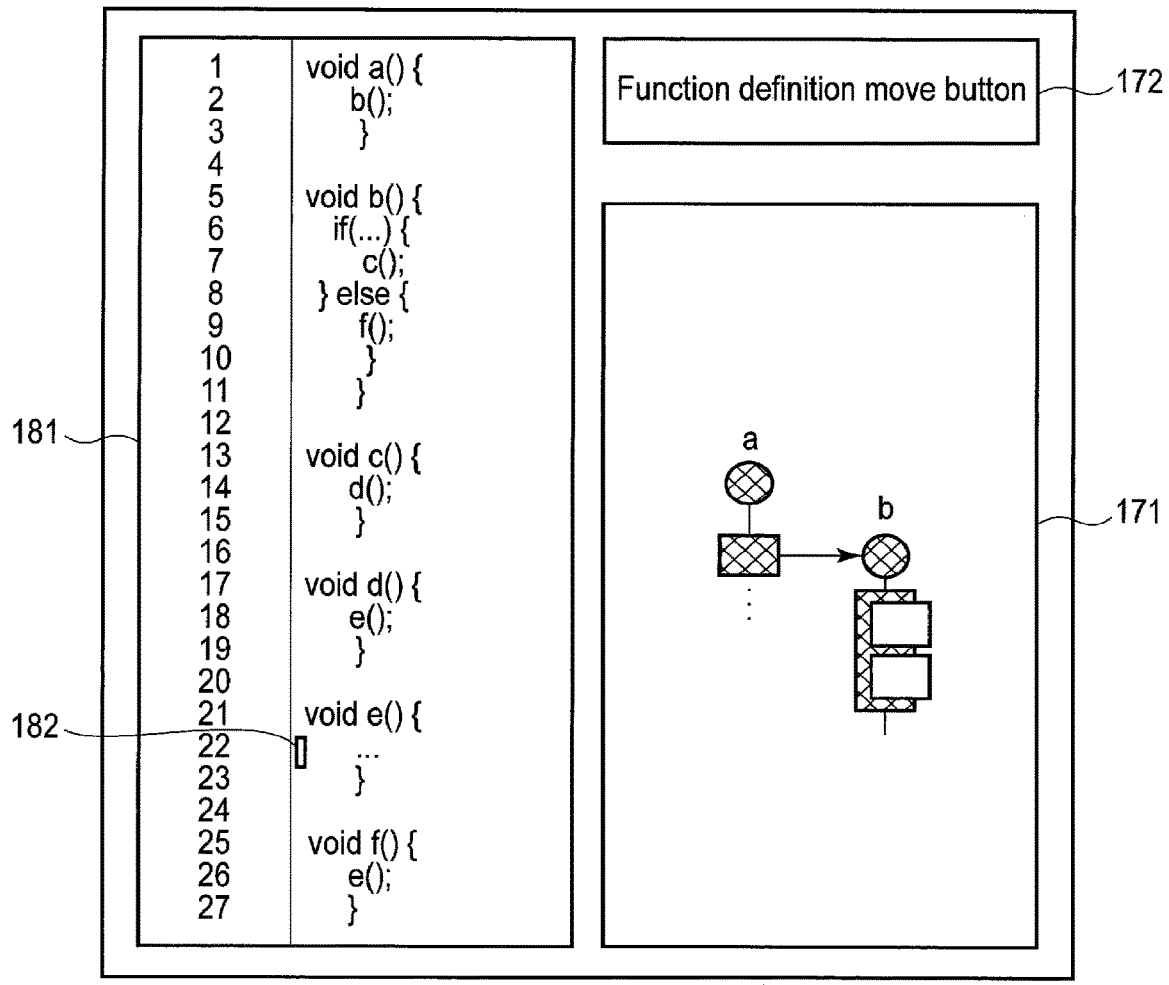
FIG. 7 is a diagram showing an example of a display screen in a code reading support operation.
FIG. 8 is a table showing an example of a movement history information table.

In general, according to one embodiment, a code reading supporting device for supporting decipher of a source code includes a code information storage, a user operation storage and an already read graph generator. The code information storage is configured to store information on a plurality of functions described in the source code, a calling relationship between the plurality of functions, and code blocks indicative of control structures in the respective plurality of functions. The user operation storage is configured to store information of an already read code block specified as a code block deciphered by the user, by input from the user, of the plurality of code blocks described in the source code. The already read graph generator is configured to generate an already read graph expressing an already read function including the already read code block, of the plurality of functions, all the code blocks included in the already read function, and a calling relationship between the already read code block and the already read function. An expression of the already read code block differs from an expression of the other code block, of all the code blocks displayed in the already read graph.

Various embodiments will be described hereinafter with reference to the accompanying drawings.

FIG. 1 is a schematic diagram showing an example of a configuration of an information processing device according to an embodiment. As shown in FIG. 1, an information processing system 100 is configured to include a main device 101, a storage 102 which stores various types of data, and a display device 103 which displays various types of data. The main device 101 is a computer body such as a personal computer and incorporates a CPU 101a, a memory (not shown), and the like. In addition, a keyboard 104 and a mouse 105 are connected to the main device 101 as input devices. The main device 101 runs various programs, based on instructions input from a user using these input devices.

The storage 102 stores a source code 106 and a code reading supporting program 107 which performs analysis of the source code to support the code reading of the source code 106.

The user can display a source code analysis result on the display device 103 by inputting the source code 106 and running the code reading supporting program 107 on the main device 101 with the keyboard 104 and the mouse 105. The source code 106 and the code reading supporting program 107 may be stored in a memory (not shown) inside the main device 101. In addition, the source code 106 and the code reading supporting program 107 may be stored preliminarily in a cloud server 300 or the like connected to the main device 101 via an Internet line 200 or the like. In this case, the source code 106 and the code reading supporting program 107 may be downloaded into the main device 101 and the code reading supporting program may be run on the main device 101, as needed.

Next, a configuration of a code reading supporting device 1 thus configured will be described.

FIG. 2 is a schematic block diagram showing an example of the configuration of the code reading supporting device according to the embodiment. The user inputs the source code 106 and runs the code reading supporting program 107 on the main device 101, and the code reading supporting device 1 is thereby executed.

The code reading supporting device 1 is configured to include a code analyzer 11, a user operation accepting unit 13, already reading estimating unit 15, and an already read graph generator 17. In addition, the code reading supporting device 1 also includes a code information storage 12, a user operation storage 14, an estimated information storage 16, a code image generator 18, and an already read graph image generator 19.

The code analyzer 11 performs parsing of the input source code 106. As a result of parsing, the code analyzer 11 acquires function information, function calling relationship information, and code block information.

The function information is information on a function name, a function definition start line number, and an end number of a function described in the source code 106. The acquired function information is recorded in a function information table 121 of the code information storage 12.

The function information recorded in the function information table 121 will be explained in detail with an example of the source code. FIG. 3 is a diagram showing an example of a source code which is a target of code reading. In addition, FIG. 4 is a table showing an example of a function information table.

The source code 106 shown in FIG. 3 is described in C language, and six functions a, b, c, d, e, and f are defined in the source code 106.

Function a is described in the first to third lines, and its start line number is 1 and its end line number is 3. Function b is described in the fifth to eleventh lines, and its start line number is 5 and its end line number is 11. Function c is described in the thirteenth to fifteenth lines, and its start line number is 13 and its end line number is 15. Function d is described in the seventeenth to nineteenth lines, and its start line number is 17 and its end line number is 19. Function e is described in the twenty-first to twenty-third lines, and its start line number is 21 and its end line number is 23. Function f is described in the twenty-fifth to twenty-seventh lines, and its start line number is 25 and its end line number is 27.

In the function information table 121, three data elements, i.e., function name, start line number, and end line number, are registered for each function as one record. Therefore, as a result of analyzing the source code 106 shown in FIG. 3 by the code analyzer 11, six records of six functions, i.e., function a, function b, function c, function d, function e, and function f are registered in the function information table 121 as shown in FIG. 4.

The function calling relationship information, in functions described in the source code 106, is information indicative of a relationship between a calling function and a called function in a case of calling the other function from within functions. More specifically, the information is information on a name of the calling function, a name of the called function, and a number of a line calling the function. The acquired function calling relationship information is recorded in a calling relationship information table 122 of the code information storage 12.

The function calling relationship information to be recorded in the calling relationship information table 122 will be explained in detail with an example of the source code shown in FIG. 3. FIG. 5 is a table showing an example of the calling relationship information table.

It is analyzed whether the other function is called from within each of six functions, i.e., function a, function b, function c, function d, function e, and function f described in the source code 106 shown in FIG. 3 or not. Function a calls function b in the second line. Function b calls function c in the seventh line. In addition, function b calls function f in the ninth line. Function c calls function d in the fourteenth line. Function d calls function e in the eighteenth line. Function e does not call the other function. Function f calls function e in the twenty-sixth line.

In the calling relationship information table 122, three elements of data, i.e., calling function name, called function name, and call line number are registered as one record for each calling relationship of functions. Therefore, as a result of analyzing the source code 106 shown in FIG. 3 by the code analyzer 11, six records of six calling relationships of calling of function b from function a, calling of function c from function b, calling of function f from function b, calling of function d from function c, calling of function e from function d, and calling of function e from function f are registered in the calling relationship information table 122 as shown in FIG. 5.

The code block information is information indicative of inclusion relation between a code block and a range of a code block existing in the function, with respect to the function described in the source code 106. The code block is a set of codes in the function and is indicative of a control structure such as branch, selection, and the like. For example, a set of codes starting with { and ending with } can be set as a code block.

An ID which can be uniquely identified in the source code 106 of analysis target is assigned to each code block. If a plurality of code blocks exist in the same line of the source code 106, the inclusion relation is calculated from the line number and the code block of a wider range is regarded as a parent code block.

Information acquired as the code block information is, specifically, information of code block ID, start line number, end line number, and parent code block ID. The acquired code block information is recorded in a code block information table 123 of the code information storage 12. The code block information will be explained concretely with reference to FIG. 6. FIG. 6 is a table showing an example of a code block information table. FIG. 6A shows an example of a source code explicitly indicating the range of the code block, and FIG. 6B shows code block information table 123 corresponding to the source code of FIG. 6A. The source code shown in FIG. 6B is the same as the source code shown in FIG. 3.

First, { indicative of the start of code block is retrieved in order from the first line of the source code 106. Then, { is extracted in the first line. The start line number of the first code block (i.e., code block of ID1) is set to 1. Next, } indicative of the end of the code block is retrieved. Then, } is extracted in the third line. The end line number of the code block of ID1 is set to 3.

Next, { indicative of the start of next code block is extracted in the fifth line. The start line number of the second code block (i.e., code block of ID2) is set to 5. Next, } indicative of the end of the code block is retrieved. Then, { indicative of the start of next code block is extracted in the sixth line before extracting }. Therefore, a code block of ID3 is started before the code block of ID2 is ended, and it is analyzed that its start line number is 6.

Next, { indicative of the end of the code block of ID3, which is a code block started later, is retrieved. Then, } is extracted in the seventh line. The end line number of the code block of ID3 is set to 7. Next, } indicative of the end of the code block of ID2 is retrieved. Then, { indicative of the start of next code block is extracted in the eighth line before extracting }. Therefore, a code block of ID4 is started before the code block of ID2 is ended, and it is analyzed that its start line number is 8.

Next, } indicative of the end of the code block of ID4, which is a code block started later, is retrieved. Then, } is extracted in the ninth line. The end line number of the code block of ID4 is set to 9. Next, } indicative of the end of the code block of ID2 is retrieved. Then, } is extracted in the eleventh line. The end line number of the code block of ID2 is set to 11.

Thus, the range of the code block is specified by sequentially retrieving { indicative of the start of code block and } indicative of the end of code block. In the code block shown in FIG. 6A, eight code blocks of ID1 to ID8 exist, and it is analyzed that the range of each code block is a range represented by a thick line, which is shown on the left side of each ID.

A plurality of code blocks exist in the sixth to ninth lines. More specifically, the code blocks of ID2 and ID3 exist in the sixth and seventh lines, and the code blocks of ID2 and ID4 exist in the eighth and ninth lines. Then, the inclusion relation of each of the code blocks will be reviewed.

Since the start line number of the code block of ID2 is 5 and the end line number is 11, its range is seven lines. In contrast, since the start line number of the code block of ID3 is 6 and the end line number is 7, its range is two lines. Therefore, since the range of the code block of ID2 is wider than the range of the code block of ID3, the code block of ID3 is determined to be included in the code block of ID2. That is, it is analyzed that the parent code block ID of the code block of 103 is 2.

In addition, since the start line number of the code block of ID4 is 8 and the end line number is 9, its range is two lines. Therefore, since the range of the code block of ID2 is wider than the range of the code block of ID4, the code block of ID4 is determined to be included in the code block of ID2. That is, it is analyzed that the parent code block ID of the code block of ID4 is 2.

Four data elements, i.e., code block ID, start line number, end line number, and parent code block ID are recorded as one record for each code block, in the code block information table 123. Therefore, as a result of analyzing the source code 106 shown in FIG. 6A by the code analyzer 11, eight records of the code blocks of ID1 to ID8 are registered in the code block information table 123 as shown in FIG. 6B.

The code information storage 12 stores the function information, the function calling relationship information, and the code block information which are obtained as a result of analyzing the source code 106 by the code analyzer 11. The function information is stored in the function information table 121, the function calling relationship information is stored in the calling relationship information table 122, and the code block information is stored in the code block information table 123. The data stored in the function information table 121, the calling relationship information table 122, and the code block information table 123 is read from the user operation accepting unit 13, the already reading estimating unit 15, and the already read graph generator 17 as needed.

The user operation accepting unit 13 reads a line number and a character string of a cursor position set on the source code 106 displayed on the display device 103 and, if the function is called in the line, retrieves a position of definition of the called function. Then, the user operation accepting unit 13 requests the code image generator 18 to display the called function. The user presses a function definition move button 172 during the operation of the code reading supporting device 1 and the user operation accepting unit 13 thereby operates.

A screen displayed on the display device 103 during the operation of the code reading supporting device 1 will be explained with respect to FIG. 7. FIG. 7 is a diagram showing an example of the display screen in the code reading support operation.

As shown in FIG. 7, a source code display screen 181, an already read graph display screen 171, and a function definition move button 172 are displayed on the display device 103 during the code reading supporting operation.

A portion which the user checks visually in the source code 106 of analysis target is displayed on the source code display screen 181. A cursor 182 indicative of a certain line is arranged on the source code display screen 181. Display contents of the source code display screen 181 (i.e., source code parts displayed on the screen) are generated by the code image generator 18.

A code block which the user has already read (deciphered), and a calling relationship of the code block are shown in the already read graph display screen 171. The display contents on the already read graph display screen 171 are generated by the already read graph image generator 19.

When a function is called in the line where the cursor 182 is located, a portion of a definition of the called function is displayed on the source code display screen 181 by the function definition move button 172. When the user presses the function definition move button 172, the line number where the cursor 182 is located and the character string described in the line (description content of the line in the source code 106) are input to the user operation accepting unit 13.

The user operation accepting unit 13 requests the code analyzer 11 to perform lexical analysis of the input character string. When a function is called in the line where the cursor 182 is located, the function name is acquired from the code analyzer 11. In FIG. 7, for example, when the function definition move button 172 is pressed in a state in which the cursor 182 is located in the fourteenth line of the source code, line number 14 and character string d( ); are input to the user operation accepting unit 13. The user operation accepting unit 13 requests the code analyzer 11 to analyze character string d( ). Then, the user operation accepting unit 13 acquires function name d from the code analyzer 11 as a result of the analysis.

Next, the user operation accepting unit 13 retrieves a part of a definition of the called function. More specifically, the user operation accepting unit 13 extracts the record of the function name acquired from the code analyzer 11 from the function information table 121 and acquires a start line number of the record. For example, if the user operation accepting unit 13 acquires function name d from the code analyzer 11, the user operation accepting unit 13 retrieves the record in which the function name is d in the function information table 121. In the function information table 121 shown in FIG. 4, the record of the fourth line is extracted and start line number 17 is acquired. Then, the user operation accepting unit 13 inputs the start line number acquired from the function information table 121 to the code image generator 18, and requests the source code of the part including the line number to be displayed on the source code display screen 181.

In addition, the user operation accepting unit 13 records the line number of movement source (line number in which the cursor is located when the function definition move button 172 is pressed), and the line number of movement destination (line number which the code image generator 18 is requested to display), as the movement history information, in a movement history information table 141 of the user operation storage 14. FIG. 8 is a table showing an example of the movement history information table. When the user presses the function definition move button 172 and moves display from a certain function to another function called in the certain function, the movement history information table 141 records a history of the movement. In the movement history information table 141, two data elements, i.e., movement source line number and movement destination line number, are registered as one record for each movement history.

For example, performing the movements from function a to function b, from function b to function c, and from function c to function d by pressing the function definition move button 172 will be described below. The information on the movement from function a to function b is recorded in the first record. That is, the line number which calls function b in function a, i.e., 2 is recorded in the movement source line number, and the start line number of function b, i.e., 15 is recorded in the movement destination line number. The information on the movement from function b to function c is recorded in the second record. That is, the line number which calls function c in function b, i.e., 7 is recorded in the movement source line number, and the start line number of function c, i.e., 13 is recorded in the movement destination line number. The information on the movement from function c to function d is recorded in the third record. That is, the line number which calls function d in function c, i.e., 14 is recorded in the movement source line number, and the start line number of function d, i.e., 17 is recorded in the movement destination line number.

When the user presses the function definition move button 172 and moves the portion where the source code is displayed from a certain function to another function called in the certain function, the user operation storage 14 stores and records a history of the movement in the movement history information table 141. The data stored in the movement history information table 141 is read from the already reading estimating unit 15 as needed.

The already reading estimating unit 15 performs determination of the portion which the user has already read in the source code and estimation of the already read portion. The determination and estimation of the already read portion are performed in code block units. The determination of the already read portion is performed based on the movement history information table 141. That is, the code block having the line numbers included in the movement source line number and the movement destination line number of the movement history information table 141 is set to have been already read.

First, the name of the function having the line number recorded in the movement history information table 141 is extracted from the function information table 121 and it is specified which function has moved. For example, in the movement history information table 141 shown in FIG. 8, the movement source of the first record is function a and the movement destination of the first record is function b, and the movement source of the second record is function b and the movement destination of the second record is function c. Furthermore, the movement source of the third record is function c and the movement destination of the third record is function d.

Next, it is determined whether the function name of movement destination of the n-th record corresponds to the function name of movement source of the n+1-th record or not. If the function names correspond, calling the function is performed and the movement history is recorded by the function definition move button 172, and it is thereby determined that the function names have connection based on the function calling relationship in the movement history information table 141. In contrast, if the function names do not correspond, the movement history is not recorded since, for example, the user scrolls the screen and the screen moves to the called function, and it is thereby determined that the function names have no connection based on the function calling relationship in the movement history information table 141.

In the above-mentioned example, since the function name of movement destination of the first record and the function name of movement source of the second record are function b, it is determined that the function names have connection based on the calling relationship between the first record and the second record. In addition, since the function name of movement destination of the second record and the function name of movement source of the third record are function c, it is determined that the function names also have connection based on the calling relationship between the second record and the third record.

If it is determined that the function names have the connection, ID of the code block having the movement source line number and the movement destination line number included in the movement history information table 141 is extracted from the code block information table 123 as the already read code block. In the above-mentioned example, the line numbers recorded in the movement history information table 141 are 2, 5, 7, 13, 14, and 17 and IDs of the code blocks including these line numbers are ID1, ID2, ID3, ID5, ID5, and ID6.

Then, the function names to which these code blocks belong are extracted from the function information table 121 and recorded in the already read code block information table 161 of the estimated information storage 16. For example, in the function information table 121 shown in FIG. 4, the code block of ID1 including line number 2 belongs to function a, and the code block of ID2 including line number 5 belongs to function b. In addition, the code block of ID3 including line number 7 belongs to function b, and the code block of ID5 including line number 13 belongs to function c. In addition, the code block of ID5 including line number 14 belongs to function c, and the code block of ID6 including line number 17 belongs to function d.

Figures 9, 10:
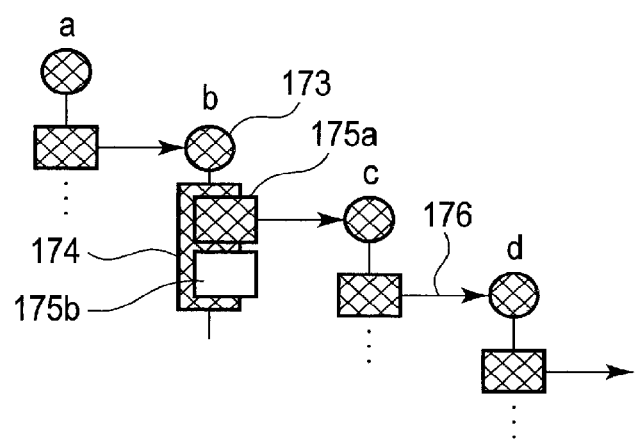
FIG. 9 is a table showing an example of an already read code block information table.
FIG. 10 is a diagram illustrating an example of an already read graph.

The already reading estimating unit 15 records the function names of the code blocks which are determined to have been already read, and the code block ID, in the already read code block information table 161 of the estimated information storage 16. FIG. 9 is a table showing an example of the already read code block information table. The code blocks having duplicated ID are recorded as one record in the already read code block information table 161. In the above example, since the code blocks of ID5 are duplicated, five records are registered in the already read code block information table 161.

That is, the record in which the function name is a and the code block ID is 1, the record in which the function name is b and the code block ID is 2, the record in which the function name is b and the code block ID is 3, the record in which the function name is c and the code block ID is 5, and the record in which the function name is d and the code block ID is 6 are registered in the already read code block information table 161.

Next, a case where a record is determined to have no connection based on the function calling relationship in the movement history information table 141 will be described. For example, the second record in the movement history information table 141 shown in FIG. 8 is not recorded in the movement history information table 141 since the user performs movement from function b to function c by scrolling or the like.

In this case, since the function name of movement destination of the first record is function b and the function name of movement source of the second record is function c, it is determined that the function names have no connection based on the calling relationship between the first record and the second record. If it is determined that the function names have no connection, the calling relationship between function b and function c is retrieved in the calling relationship table 122. That is, the record in which the calling function name of the calling relationship table 122 is function c is extracted and it is determined whether the calling function name of the record is function b or not. If a plurality of records are extracted, the determination is performed in relation to all the extracted records.

If the extracted records include the record in which the calling function name is function b, retrieving the calling relationship is ended. In contrast, if the extracted records do not include the record in which the calling function name is function b, the calling function name of the record is regarded as the called function name and retrieving the calling relationship table 122 is performed again. If the record in which the calling function name is function b is extracted, estimation of the portion having no connection is completed and retrieving is ended.

In the calling relationship table 122 shown in FIG. 5, the second record is extracted. Since the calling function name is function b in this record, retrieving is ended. Then, the code block including the line recorded in the calling line number of the extracted record is extracted from the code block information table 123. In the above case, the calling line number of the extracted record is 7 and the code block including the seventh line is ID3.

ID of the code block having the movement source line number and the movement destination line number included in the movement history information table 141 is extracted from the code block information table 123 as the already read code block. In the above-mentioned example, the line numbers recorded in the movement history information table 141 are 2, 5, 14, and 17 and IDs of the code blocks including these line numbers are ID1, ID2, ID3, and ID6. These are code blocks which are determined to have been already read. The code block (=ID3) which is estimated as the already read portion by retrieving the connection based on the function calling relationship is added to these four code blocks, and IDs and function names of five code blocks are registered in the already read code block information table 161.

The estimated information storage 16 stores a list of code blocks that have been read by the user or are estimated to have been read by the user, in the already read code block information table 161. The data stored in the already read code block information table 161 is read from the already read graph generator 17 as needed.

The already read graph generator 17 generates the function which has been already read by the user or the function which is estimated to have been already read by the user as the already read graph. The already read graph is generated based on the information stored in the code information storage 12 and the estimated information storage 16. FIG. 10 is a diagram illustrating an example of the already read graph.

In the already read graph, the functions are expressed in the diagram. The function name is acquired from the already read code block information table 161, and the acquired function is illustrated with the symbol and the function name representing the function. As shown in FIG. 10, for example, the function name of the function acquired from the already read code block information table 161, i.e., the function which has been already read by the user is displayed at an upper part of function symbol 173 shaped in a black circle. For example, if the already read graph is generated based on the already read code block information table 161 shown in FIG. 9, four functions, i.e., function a, function b, function c, and function d are illustrated in the already read graph as shown in FIG. 10.

Next, the start line number and the end line number of the illustrated function are acquired from the function information table 121. Then, the code block included in the range of the acquired line numbers is acquired from the code block information table 123. For example, in the function information table 121 shown in FIG. 4, the start line number 17 of function c is 13 and the end line number of function c is 15. In the code block information table 123 shown in FIG. 6, the code block included in this range is the code block of ID5. The acquired code block is illustrated with, for example, elongated rectangular code block symbol 174 under function symbol 173. The code block ID may be illustrated near code block symbol 174.

For example, a parent-child relationship (inclusion relation) between the extracted code blocks, of the function having a plurality of code blocks such as function b, is confirmed in the code block information table 123. Code block symbol 174 indicative of the parent code block is illustrated under function symbol 173, and code block symbols 175*a* and 175*b* indicative of child code blocks are illustrated on parent code block symbol 174. If a plurality of child code blocks are included, the code blocks having smaller start line numbers are arranged in order on the parent code block symbol 174.

To prevent parent code block symbol 174 from being hardly viewed by child code block symbols 175*a* and 175*b*, child code block symbols 175*a* and 175*b* may be illustrated to be shifted from parent code block symbol 174 on the right or left side by a predetermined width or may be illustrated in a thinner width than parent code block symbol 174.

The code blocks recorded in the already read code block information table 161 and the code blocks which are not recorded in the already read code block information table 161 are described in different manners to make the already read code blocks and unread code blocks distinguished easily and visually.

For example, the code blocks recorded in the already read code block information table 161 (i.e., already read code blocks or code blocks estimated to have been already read) have the inner sides shaded or colored in a predetermined color, similarly to code block symbol 174. In contrast, the code blocks which are not recorded in the already read code block information table 161 (unread code blocks) have rectangular frames alone illustrated similarly to code block symbol 175b or are colored in colors different from the color of code block symbol 174 of the already read code block.

Next, a function calling relationship is illustrated in relation to the code block symbols illustrated in the already read graph. Code block IDs are recorded in order of being called after starting the code reading, in the already read code block information table 161. Therefore, the code block symbol indicative of the code block ID stored in the n-th record and function symbol 173 indicative of the function name stored in the n+1-th record are linked by arrow 176 and their calling relationship is illustrated.

For example, the already read graph shown in FIG. 10 is generated by using the function information table 121 shown in FIG. 4, the code block information table 123 shown in FIG. 6, and the already read code block information table 161 shown in FIG. 9. That is, the code block of ID1 of function a is first read. Function b is called from the code block of ID1. Function b is composed of three code blocks having the inclusion relation, and child code blocks of ID3 and ID4 are included in parent code block of ID2. The parent code block of ID2 is first read by calling function b, and then the child code block of ID3 is read. Function c is called from the child code block of ID3, and the code block of ID5 of function c is read. Then, function d is called from the child code block of ID5, and the code block of ID6 of function d is read.

In the already read graph of FIG. 10, the calling relationship of the functions and the code blocks constituting the functions are explicitly expressed, and the already read code blocks and the unread code blocks are expressed to be distinguishable. Therefore, the user can easily understand the already read portions and unread portions of the source code.

The code image generator 18 performs lexical analysis of the source code 106 input to the code reading supporting device 1, by the code analyzer 11, and generates an image to display the description content corresponding to the expression of the language describing the source code on the source code display screen 181. In addition, every time the user presses the function definition move button 172, the code image generator 18 regenerates an image such that the definition portion of the called function described in the line where the cursor 182 is located is displayed in the source code display screen 181.

The already read graph image generator 19 generates the images to be displayed on the already read graph display screen 171, based on the already read graph generated by the already read graph generator 17. In addition, every time the user presses the function definition move button 172, the already read graph generated by the already read graph generator 17 is read and the images are regenerated.

Figure 11:
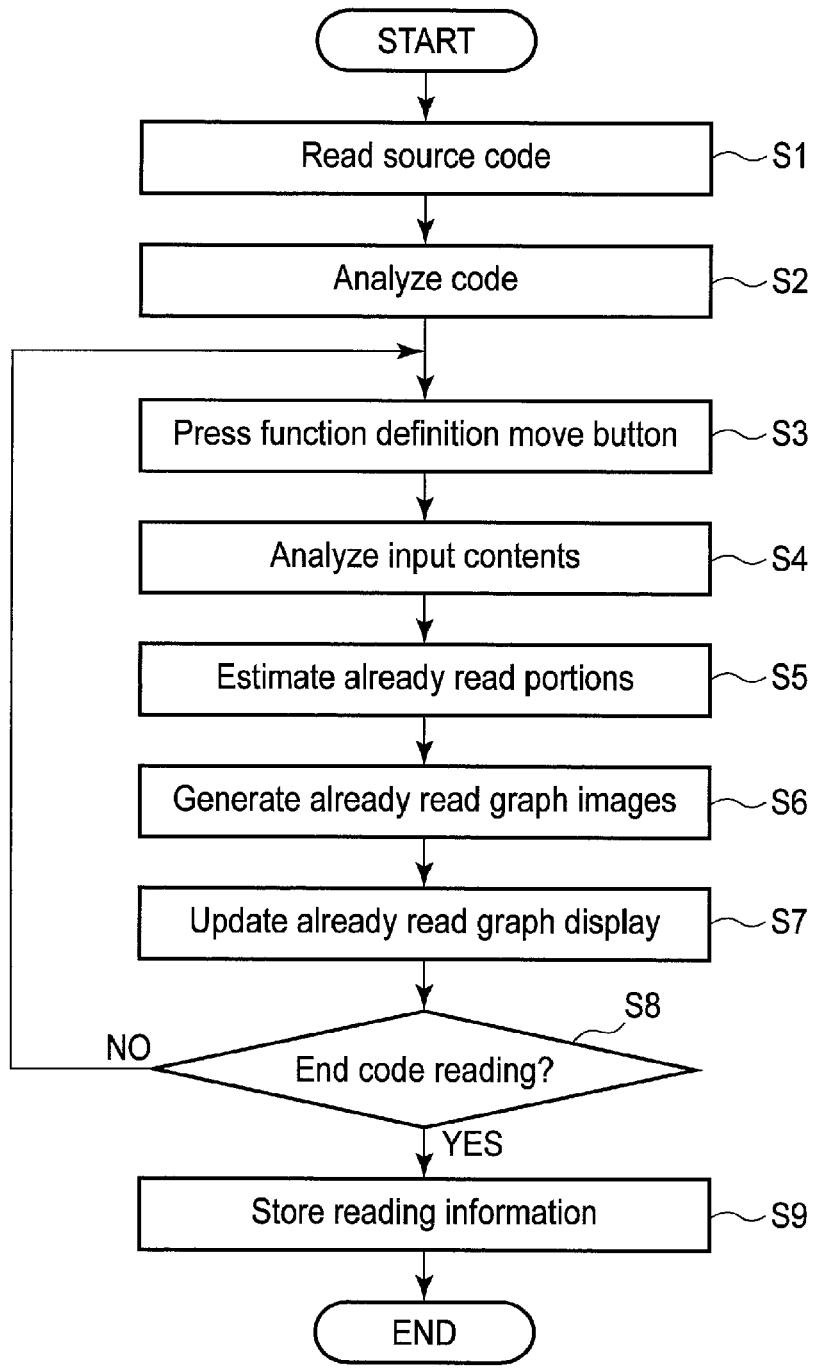
FIG. 11 is a flowchart illustrating an example of a code reading supporting method according to the embodiment.

Next, a code reading supporting method according to the embodiments will be described with reference to FIG. 11. FIG. 11 is a flowchart illustrating an example of the code reading supporting method according to the embodiment.

First, the source code 106 stored in the storage 102 or the like is read by the code reading supporting device 1 (S1). The code analyzer 11 performs lexical analysis of the read source code 106 (S2). As a result of the analysis, the source code 106 of predetermined lines from the leading line is displayed on the source code display screen 181 of the display device 103. The user scrolls the cursor 182 displayed on the source code display screen 181 by the mouse 105 or keyboard 104 input and then moves the cursor 182 to the line where the function to be checked is called.

When the user presses the function definition move button 172 in this state, the line number where the cursor 182 is located and the character string described in the line (description content of the line in the source code 106) are input to the user operation accepting unit 13 (S3). Then, lexical analysis of the input character string is performed in the code analyzer 11 and the function name described at the cursor 182 position (i.e., function name of the movement destination) is specified (S4). The user operation storage 14 stores the history of movement of function in the movement history information table 141.

Next, the already reading estimating unit 15 performs determination and estimation of the previously read portion and then performs determination of the portion which the user newly reads and estimation of the already read portion, by referring to the movement history information table 141 and the already read code block information table 161. Information on the code block which is newly determined to have been already read or the code block which is newly estimated to have been already read is stored in the already read code block information table 161.

Then, the already read graph generator 17 generates the already read graph, by using the record newly added to the already read code block information table 161 and the necessary information stored in the code information storage 12. The already read graph image generator 19 generates the image to be displayed on the already read graph display screen 171, based on the already read graph generated by the already read graph generator 17 (S6). Then, the already read graph image generator 19 outputs and displays the already read graph image generated in S6, on the already read graph display screen 171 of the display device 103 (S7).

If the flow moves to the next function and continues code reading (S8, NO), the flow returns to S3 and the user moves the cursor 182 to the line where the function to be next checked is called and presses the function definition move button 172. In contrast, if code reading is ended (S8, YES), the already read code block information table 161 is stored as already read information (S9) and a sequence of processing is ended.

Thus, according to the embodiment, when code reading is performed in relation to the already read portion of the source code, the already read function name, the code block included in the function, and the calling relationship between the code block and the function are combined and the already read graph expressing its structure is displayed. Furthermore, the already read and unread code blocks are expressed to be identified in units of code blocks, in the already read graph. Therefore, it can be easily understood which code block in the function is used to deciphered the source code. In addition, the unread portions can also be understood easily.

Furthermore, the information of path (run path) in which decipher is performed is stored in the already read code block information table and, if a plurality of workers share performing the code reading, the already read portions of one worker can be shared by the other workers and the work efficiency of code reading can be improved.

In addition, when the user moves to the called function by scrolling the screen or the like and the history of movement between the code blocks and functions is not partially recorded, the user can estimate the path of the portions which are not connected and estimate the code blocks existing in the path to have been already read, by using the movement history made before and after the movement or the structure information of the source code 106 stored in the code information storage 12. Therefore, since the already read portions of the source code can be extracted and recorded, the work efficiency of the code reading can be further improved.

The code reading supporting device 1 operates by running the code reading supporting program 107 stored in the storage 102 by CPU 101a in the above descriptions, but an application of the code reading supporting device 1 may be incorporated in the main device 101.

In addition, the information (function information table, calling relationship information table, and code block information table) on the source code subjected to code reading is analyzed and acquired by the code reading supporting device 1 in the above descriptions, but the information may be input from the outside similarly to the source code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A code reading supporting device for supporting decipher of a source code, comprising:
a storage device configured to store first information on a plurality of functions described in the source code, a calling relationship between the plurality of functions, and associated code blocks indicative of control structures in the respective plurality of functions;
an input device by which a user can specify a function and associated code blocks to be read;
a processor connected to the input device and the storage device, and configured to:
store, in the storage device, second information of an already read code block specified based on input from the user using the input device, of the plurality of code blocks described in the source code; and
generate an already read graph expressing an already read function including the already read code block, of the plurality of functions, all the associated read code blocks included in the already read function, all the associated unread code blocks associated with the already read function, and a calling relationship between the already read code block and the already read function, based on the first and second information; and
a display device connected to the processor and configured to display the already read graph generated by the processor,
wherein
the display device is configured to display visually differently the already read code block displayed in the already read graph in relation to display of unread code blocks displayed in the already read graph.

2. The code reading supporting device of claim 1, wherein the processor is configured to:
specify as an estimated read code block the code block estimated to have been already deciphered by the user, of the code blocks other than the already read code block, based on the second information stored in the storage device; and
generate the already read graph by using the estimated read code block as the already read code block.

3. The code reading supporting device of claim 1, wherein the processor is configured to:
generate a display image of the source code;
generate an image of the already read graph;
analyze the source code, and acquire information on the plurality of functions describe in the source code, a calling relationship between the plurality of functions, and the code blocks included in the respective plurality of functions; and
specify the code block deciphered by the user using the input device as the already read code block.

4. A code reading supporting method for supporting decipher of a source code, comprising:
acquiring first information on a plurality of functions described in the source code, a calling relationship between the plurality of functions, and associated code blocks indicative of control structures in the respective plurality of functions;
storing, in a storage device, second information of an already read code block specified based on input from a user using an input device, of the plurality of code blocks described in the source code; and
generating an already read graph expressing an already read function including the already read code block, of the plurality of functions, all the associated read code blocks included in the already read function, all the associated unread code blocks associated with the already read function, and a calling relationship between the already read code block and the already read function, based on the first and second information; and
displaying the already read graph on a display device, wherein
displaying of the already read code block included in the displayed already read graph visually differs from displaying of unread code blocks displayed in the already read graph.

5. The code reading supporting method of claim 4, wherein
the code block estimated to have been already deciphered by the user, of the code blocks other than the already read code block, is specified as an estimated read code block, based on a generation history of the already read code block, and
the already read graph is generated by using the estimated read code block as the already read code block.

6. A non-transitory computer-readable storage medium having stored thereon a code reading supporting program for supporting decipher of a source code which is executable by a computer, the code reading supporting program comprising instructions capable of causing the computer to execute functions of:
acquiring first information on a plurality of functions described in the source code, a calling relationship between the plurality of functions, and associated code blocks indicative of control structures in the respective plurality of functions;

storing, in a storage device, second information of an already read code block specified based on input from a user using an input device, of the plurality of code blocks described in the source code; and generating an already read graph expressing an already read function including the already read code block, of the plurality of functions, all the associated read code blocks included in the already read function, all the associated unread code blocks associated with the already read function, and a calling relationship between the already read code block and the already read function, based on the first and second information; and displaying the already read graph on a display device, wherein displaying of the already read code block included in the displayed already read graph visually differs from displaying of unread code blocks displayed in the already read graph.

7. The non-transitory computer-readable storage medium of claim 6, wherein the code reading supporting program comprises instructions capable of causing the computer to execute functions of:

specifying the code block estimated to have been already deciphered by the user, of the code blocks other than the already read code block, as an estimated read code block, based on a generation history of the already read code block; and generating the already read graph by using the estimated read code block as the already read code block.

* * * * *